(12) United States Patent
Brothers et al.

(10) Patent No.: US 12,072,789 B2
(45) Date of Patent: Aug. 27, 2024

(54) RESUMABLE INSTRUCTION GENERATION

(71) Applicant: Huawei Technologies Co., Ltd., Shenzhen (CN)

(72) Inventors: Michael Brothers, Pflugerville, TX (US); Michael Vaden, Austin, TX (US); Jingliang Wang, Austin, TX (US); Noah Sherrill, Austin, TX (US); Stephen Edwards, Austin, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 70 days.

(21) Appl. No.: 18/074,167

(22) Filed: Dec. 2, 2022

(65) Prior Publication Data

US 2023/0101154 A1 Mar. 30, 2023

Related U.S. Application Data

(63) Continuation of application No. PCT/US2020/063654, filed on Dec. 7, 2020.

(60) Provisional application No. 63/034,771, filed on Jun. 4, 2020.

(51) Int. Cl.
| | |
|---|---|
| *G06F 11/27* | (2006.01) |
| *G06F 9/00* | (2018.01) |
| *G06F 9/445* | (2018.01) |
| *G06F 9/455* | (2018.01) |
| *G06F 11/14* | (2006.01) |
| *G06F 11/20* | (2006.01) |
| *G06F 11/36* | (2006.01) |

(52) U.S. Cl.
CPC ...... *G06F 11/3684* (2013.01); *G06F 11/3688* (2013.01)

(58) Field of Classification Search
CPC .. G06F 11/3684; G06F 11/3688; G06F 30/30; G06F 11/2236; G06F 30/33; G06F 30/3308; G06F 11/263
See application file for complete search history.

(56) References Cited

U.S. PATENT DOCUMENTS 6,425,102 B1 * 7/2002 Matsushita ............. G06F 11/27
714/E11.169

OTHER PUBLICATIONS

Adir, A., "Genesys-Pro: Innovations in Test Program Generation for Functional Processor Verification," IEEE Design & Test of Computers, IEEE Service Center, New York, NY, US, Mar. 1, 2004, 11 pages.
Synopsis, "VCS/VCSi User Guide," Version X-2005.06, Aug. 2005, 964 pages.

(Continued)

*Primary Examiner* — Thuy Dao
(74) *Attorney, Agent, or Firm* — Conley Rose, P.C.

(57) ABSTRACT

A method for generating instruction sequences for testing a processor design model. The method includes receiving, by an instruction sequence generator (ISG), an initial test template. The initial test template includes an initial set of instruction constraints and a save resumable state command. The ISG generates a first set of executable test instructions based on the initial test template. The ISG initiates the save resumable state command. The ISG creates and saves a snapshot that includes information on a resume state of the ISG and the first set of executable test instructions at the time the save resumable state command is initiated.

20 Claims, 12 Drawing Sheets

(56) References Cited

OTHER PUBLICATIONS

Mentor Graphics, "Scan and ATPG Process Guide," Software Version 8.2004_2,400 pages.
Mammo, B., et al., "BugMD: Automatic Mismatch Diagnosis for Bug Triaging," 2016 IEEE/ACM International Conference on Computer-Aided Design (ICCAD), ACM, Nov. 7, 2016, 7 pages.
Storm, J., "Random Test Generators for Microprocessor Design Validation," Sun Microsystems, 8th EMICRO Port Alegre, RS, Brazil, May 12, 2006, 59 pages.
"asureISG-instruction-stream-generator-T&VS," Retrieved from the Internet: https://web.archive.org/web/20200117204419/http://www.testandverification.com/solutions/asureisg-instruction-stream-generator/, retrieved on Mar. 18, 2021, 2 pages.

* cited by examiner

400

```
class MyMainSequence(Sequence)
    def generate(self, **kargs):
        for _ in range(10):
            self.genInstruction( "LD##RISCV",{"NoPreamble" :1})
        self.saveResumableState( )
```

```
Cpu 0 PC(VA) 0x0000000080011000 op: 0x0000000062b83783 : ld   x15, 1579(x16)
Cpu 0 PC(VA) 0x0000000080011004 op: 0x000000004487b303 : ld   x6,  1096(x15)
Cpu 0 PC(VA) 0xaa00000080011008 op: 0x00000000ff64b583 : ld   x11, -10(x9)
Cpu 0 PC(VA) 0x000000008001100c op: 0x000000008731bb03 : ld   x22, -1933(x3)
Cpu 0 PC(VA) 0x0000000080011010 op: 0x000000004885b103 : ld   x2,  1160(x11)
Cpu 0 PC(VA) 0x0000000080011014 op: 0x00000000c9013b83 : ld   x23, -880(x2)
Cpu 0 PC(VA) 0x0000000080011018 op: 0x000000002d20bd83 : ld   x27, 722(x1)
Cpu 0 PC(VA) 0x000000008001101c op: 0x0000000068033383 : ld   x7,  1664(x6)
Cpu 0 PC(VA) 0x0000000080011020 op: 0x00000000dc7e3d03 : ld   x26, -569(x28)
Cpu 0 PC(VA) 0x0000000080011024 op: 0x00000000b08ebf83 : ld   x31, -1272(x29)
Cpu 0 PC(VA) 0x0000000080011028 op: 0x000000000000006f : j    pc + 0x0
```

```
from base.Sequence import Sequence
from DV.riscv.trees.Instruction_tree import RV32I_instructions class MyMainSequence(Sequence) :
    def generate(self, : **kargs):
        self.loadResumableState( )
        for _ in range(10):
            the_instruction = self. pickWeighted(RV32I_instructions)
            self.genInstruction(the_instruction)
```

FIG. 6

```
Cpu 0 PC(VA) 0x0000000080011000 op: 0x0000000062b83783 : ld    x15, 1579(x16)
Cpu 0 PC(VA) 0x0000000080011004 op: 0x000000004487b303 : ld    x6,  1096(x15)
Cpu 0 PC(VA) 0xaa0000008001l008 op: 0x00000000ff64b583 : ld    x11, -10(x9)
Cpu 0 PC(VA) 0x000000008001100c op: 0x000000008731bb03 : ld    x22, -1933(x3)
Cpu 0 PC(VA) 0x0000000080011010 op: 0x000000004885b103 : ld    x2,  1160(x11)
Cpu 0 PC(VA) 0x0000000080011014 op: 0x00000000c9013b83 : ld    x23, -880(x2)
Cpu 0 PC(VA) 0x0000000080011018 op: 0x000000002d20bd83 : ld    x27, 722(x1)
Cpu 0 PC(VA) 0x000000008001101c op: 0x0000000068033383 : ld    x7,  1664(x6)
Cpu 0 PC(VA) 0x0000000080011020 op: 0x00000000dc7e3d03 : ld    x26, -569(x28)
Cpu 0 PC(VA) 0x0000000080011024 op: 0x00000000b08ebf83 : ld    x31, -1272(x29)
Cpu 0 PC(VA) 0x0000000080011028 op: 0x000000000806faa93 : slti   x21, x31, -2042
Cpu 0 PC(VA) 0x0000000080011002 op: 0x0000000052025c63  : bgez   x4, pc + 1336
Cpu 0 PC(VA) 0xaa00000080011030 op: 0x00000000080006b7  : lui    x13, 0x8000
Cpu 0 PC(VA) 0x0000000080011034 op: 0x00000000ded6869b  : addiw  x13, x13, -531
Cpu 0 PC(VA) 0x0000000080011038 op: 0x0000000000d69693  : slli   x13, x13, 13
Cpu 0 PC(VA) 0x000000008001103C op: 0x00000000c9d68693  : addi   x13, x13, -867
Cpu 0 PC(VA) 0x0000000080011040 op: 0x0000000000c69693  : slli   x13, x13, 12
Cpu 0 PC(VA) 0x0000000080011044 op: 0x000000004ab68693  : addi   x13, x13, 1195
Cpu 0 PC(VA) 0x0000000080011048 op: 0x0000000000c69693  : slli   x13, x13, 12
Cpu 0 PC(VA) 0x000000008001104C op: 0x0000000072368693  : addi   x13, x13, 1827
Cpu 0 PC(VA) 0x0000000080011050 op: 0x0000000073e6c683  : lbu    x13, 1854(x13)
Cpu 0 PC(VA) 0x0000000080011054 op: 0x0000000041a7d193  : srai   x3, x15, 26
Cpu 0 PC(VA) 0x0000000080011058 op: 0x000000007bd4f6e3  : bgeu   x9, x29, pc + 4012
Cpu 0 PC(VA) 0x0000000080012004 op: 0x000000007a027993  : andi   x19, x4, 1952
Cpu 0 PC(VA) 0x0000000080012008 op: 0x00000000404a5fb3  : sra    x31, x20, x4
Cpu 0 PC(VA) 0x000000008001200C op: 0x0000000040688633  : sub    x12, x17, x6
Cpu 0 PC(VA) 0x0000000080012010 op: 0x0000000058424913  : xori   x18, x4, 1412
Cpu 0 PC(VA) 0x0000000080012014 op: 0x00000000404ed593  : srai   x11, x29, 4
Cpu 0 PC(VA) 0x0000000080012018 op: 0x000000000000006f  : j      pc + 0x0
```

FIG. 7

RESUMABLE INSTRUCTION GENERATION

CROSS-REFERENCE TO RELATED APPLICATIONS

This application is a continuation of International Patent Application No. PCT/US2020/063654 filed on Dec. 7, 2020, by Futurewei Technologies, Inc., and titled "Resumable Instruction Generation," which claims the benefit of U.S. Provisional Patent Application No. 63/034,771 filed Jun. 4, 2020, by Futurewei Technologies, Inc., and titled "Resumable Generation in an Instruction Sequence Generator." The aforementioned applications are incorporated by reference in their entireties.

TECHNICAL FIELD

The present disclosure is generally related to design verification of processors, and more particularly to a resumable instruction generation in an Instruction Sequence Generator (ISG) tool.

BACKGROUND

ISGs are important tools in the verification of processors and system on a chip(s) (SoCs). The randomized test cases produced by the ISG are run against test models of the processor to verify and debug the function of the processor prior to release of the design to the fabricators. The automatic generation is essential in order to generate the quantity of test cases necessary to validate complex modern designs.

SUMMARY

Disclosed herein are various systems and methods that allow instruction sequence generation to resume from a state achieved by prior instruction generation and emulation. For example, after generation of a certain sequence of instructions, the architectural state and generator state are saved, and subsequent instruction generation sequences are generated and emulated using the saved state as their initial conditions. The disclosed embodiments increase the coverage and shorten the verification cycle for instruction set architecture (ISA) central processing unit (CPU) design verification compared to current instruction sequence generation systems.

A first aspect relates to a method performed by an ISG for generating instruction sequences for testing a processor design model. The method includes receiving, by the ISG, an initial test template. The initial test template includes an initial set of instruction constraints and a save resumable state command. The ISG generates a first set of executable test instructions based on the initial test template. The first set of executable test instructions is used to test the processor design model. In an embodiment, executing the first set of executable test instructions by the processor design model places the processor design model to a desired internal processor state. The ISG initiates the save resumable state command when the ISG encounters the save resumable state command in the initial test template, which causes the ISG to create and save a snapshot that includes information on a resume state of the ISG and the first set of executable test instructions at the time the save resumable state command is initiated. The information in the snapshot can be used to place to the processor design model back to the desired internal processor state.

A second aspect relates to an apparatus for generating instruction sequences for testing a processor design model. The apparatus includes memory storing instructions; and a processor in communication with the memory, the processor configured to execute the instructions to cause the apparatus to: initiate an ISG; receive, by the ISG, an initial test template that includes an initial set of instruction constraints and a save resumable state command; generate, by the ISG, a first set of executable test instructions based on the initial test template; initiate, by the ISG, the save resumable state command to create and save a snapshot that includes information on a resume state of the ISG and the first set of executable test instructions at the time the save resumable state command is initiated.

Optionally, in a first implementation according to the any of the preceding aspects, the ISG can receive a first adjunct test template, the first adjunct test template includes a second set of instruction constraints and a resume state command; initiate the resume state command to load the information from the snapshot; and generate a second set of executable test instructions based on the first adjunct test template at the resume state of the ISG.

Optionally, in a second implementation according to the any of the preceding aspects, the resume state is a current snapshot of an architectural state and an internal state of the ISG; the architectural state can include register values, memory state, and translation table state; and the internal state of the ISG can include a random number generation state and constraint information.

Optionally, in a third implementation according to the any of the preceding aspects the second set of executable test instructions is appended to the first set of executable test instructions to generate a combined set of executable test instructions.

Optionally, in a fourth implementation according to the any of the preceding aspects, the ISG can receive a second adjunct test template, the second adjunct test template includes a third set of instruction constraints; the ISG generates a third set of executable test instructions based on the second adjunct test template at the resume state of the ISG; and appends the third set of executable test instructions to the first set of executable test instructions to generate a second combined set of executable test instructions.

Optionally, in a fifth implementation according to the any of the preceding aspects, the ISG can receive a second save resumable state command specified in the first adjunct test template; the ISG creates a second resume state of the ISG; and saves the combined set of executable test instructions and the second resume state of the ISG.

Optionally, in a sixth implementation according to the any of the preceding aspects, the ISG can receive a third adjunct test template that includes a fourth set of instruction constraints and a second resume state command; the ISG loads the second resume state of the ISG in response to initiating the second resume state command; the ISG generates a fourth set of executable test instructions based on the third adjunct test template at the second resume state of the ISG; and the ISG appends the fourth set of executable test instructions to the combined set of executable test instructions to generate a second combined set of executable test instructions.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is a diagram illustrating an example of an initial test template in accordance with an embodiment of the present disclosure.

FIG. 5 is a diagram illustrating an example of a test case in accordance with an embodiment of the present disclosure.

FIG. 6 is a diagram illustrating an example of an adjunct test template in accordance with an embodiment of the present disclosure.

FIG. 7 is a diagram illustrating an example of a test case resulting from running the adjunct test template in accordance with an embodiment of the present disclosure.

DETAILED DESCRIPTION

Figure 1:
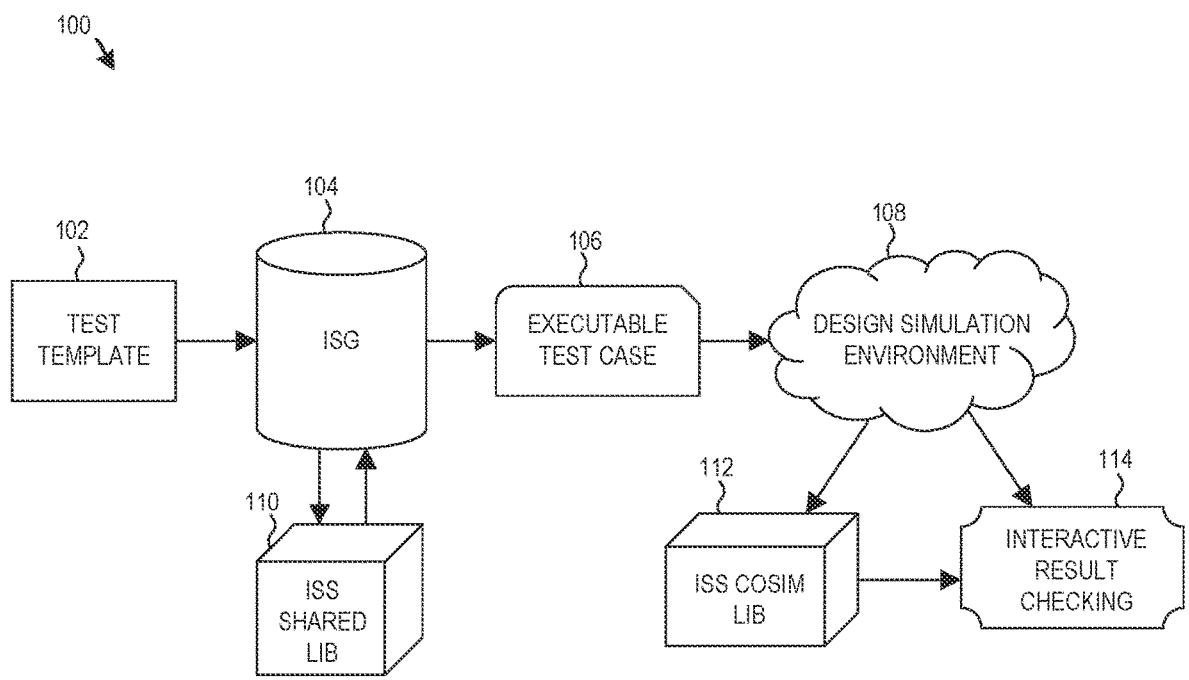
FIG. 1 is a diagram illustrating a process for generating random instruction sequences for testing a processor design model in accordance with an embodiment of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Verifying the complete design of complex micro-processors and SoCs is challenging due to the large number of states and functions in the design space. ISGs can be used to improve functional verification of complex processor designs. For example, ISGs are able to create large numbers of automatically generated test cases. The test cases can combine the value of randomization with the ability to selectively constrain the generation to focus the function of the created test cases on specific portions of a processor design under test. Certain conditions or states within the design under test (e.g., a full queue or certain mixture of concurrent operations) may be unlikely to occur if the generation is random. While randomized test generation may eventually produce a desired internal CPU state, this internal state may occur very infrequently making thorough testing of all of the CPU functions related to this internal state difficult. Specific test templates can be designed to cause those conditions within the processor under test to be much more likely to occur. Once these particular conditions or states within the design under test are achieved, having the capability to meld sequences from those test templates with additional sequences that can focus on testing portions of the processor in the context of those certain conditions would be advantageous. That is, once a particular state or condition is achieved (e.g., while the issue queue is nearly full), it would be advantageous to be able to generate additional instructions/test cases for this particular state.

To achieve the above objective, the disclosed embodiments present a resumable generation mechanism of a random instruction stream generation tool that will assist in CPU core development. In an embodiment, the resumable generation mechanism enables a user to select a resume point (e.g., defined by some marker) in an instruction generation sequence that can be used as initial conditions for the generation of additional instructions. The resume point could occur at any point during an instruction generation sequence such as during the middle or at the end of an instruction generation sequence. In an embodiment, when a resume point is reached, a resume state that includes the state of the architectural model and the state of the ISG is created and saved. The resume state forms the initial conditions or starting point for additional instruction generation. For example, after generation of a certain sequence of instructions, the architectural state and generator state are saved, and subsequent instruction generation sequences are generated and emulated using the saved state as their initial conditions. The disclosed embodiments increase the coverage and shorten the verification cycle for instruction set architecture (ISA) central processing unit (CPU) design verification compared to current instruction sequence generation systems.

FIG. 1 is a schematic drawing illustrating a process 100 for generating random instruction sequences for testing a processor design model in accordance with an embodiment of the present disclosure. In the depicted embodiment, an ISG 104 receives as input a test template 102 that includes a set of instruction constraints. The ISG 104 can be an application executed on a machine or can be a specially configured apparatus designed to generate instruction sequences for testing a processor design. The instruction constraints can define which instructions should be generated, the order of the instructions, and their interrelationships. The instruction constraints can also define the specifics for each instruction such as, but not limited to, which processor registers and memory addresses to use. A user defines the instruction generation sequence and the appropriate constraints in the test template 102 using a particular programming language such as, but not limited to, C or Python. The test template 102 can be saved in memory or in a data storage unit on the same device as the device executing the ISG 104 or can be saved on a remote device from the device executing the ISG 104. Similarly, any adjunct test templates as described herein, can be saved on a local or remote device.

The ISG 104 generates executable test case 106 based on the test template 102. The executable test case 106 comprises instruction sequences that can be used for design verification of a processor. In an embodiment, the ISG 104 is a dynamic ISG that executes each generated instruction using an Instruction Set Simulator (ISS) shared library (lib)

110. The ISS shared lib 110 enables the ISG 104 to simulate the operation of a processor and determine the architectural machine state of the processor at any given moment. In an embodiment, the ISG 104 is a FORCE-RISCV ISG for the RISC-V instruction set architecture. RISC-V is an open standard instruction set architecture based on established reduced instruction set computer principles. FORCE-RISCV uses randomization to choose instructions, registers, addresses and data for the executable test case 106, and can generate valid test sequences with very little input from the user. FORCE-RISCV provides a set of application programming interfaces (APIs) with extensive capabilities which gives the user a high level of control over how the instruction generation takes place. In an embodiment, the test template 102 is used to control FORCE-RISCV instruction generation by invoking the FORCE-RISCV APIs to define constraints and specify the instructions.

In an embodiment, the executable test case 106 is executed in a design simulation environment 108 containing test models of the processor. The design simulation environment 108 includes an ISS co-simulation (cosim) lib 112 that enables the design simulation environment 108 to simulate the behavior of a processor design by reading instructions and maintaining internal variables which represent the processor's registers. The design simulation environment 108 can perform interactive result checking 114 to determine that the state of the processor is correct as each of the executable test case 106 is executed.

Figure 2:
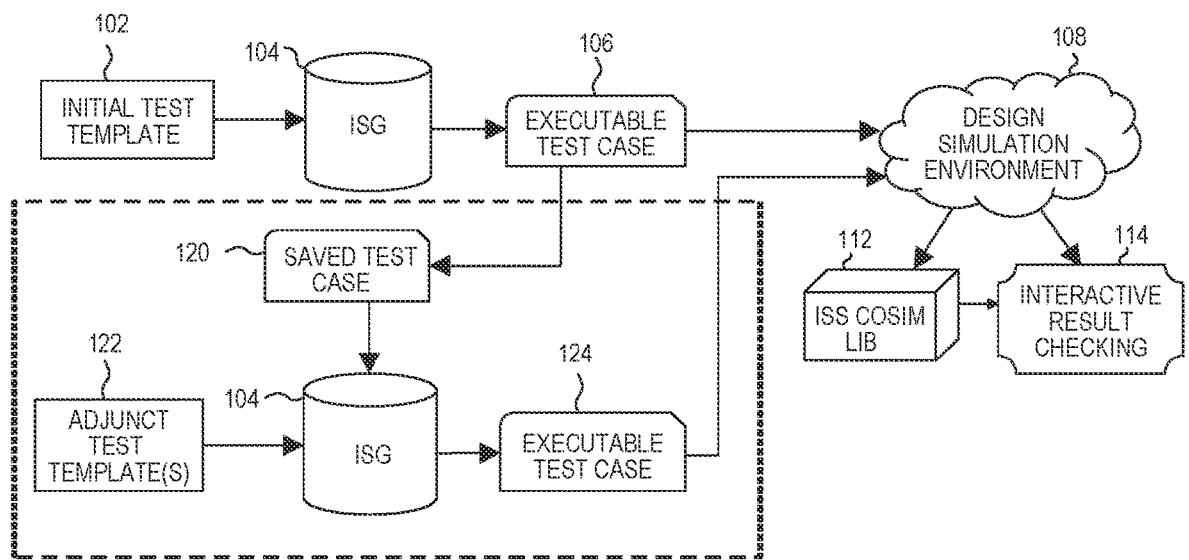
FIG. 2 is a diagram illustrating a process for resumable instruction generation for testing a processor design model in accordance with an embodiment of the present disclosure.

FIG. 2 is a schematic drawing illustrating a process 200 for resumable instruction generation for testing a processor design model in accordance with an embodiment of the present disclosure. The process 200 includes the test template 102, ISG 104, executable test cases 106, design simulation environment 108, cosim lib 112, and the interactive result checking 114 as described in FIG. 1. The process 200 modifies the process 100 by providing a new capability that enables the executable test case 106 to be saved as a saved test case 120 when a user-specified resume point or marker (i.e., a user-specified state or condition of the processor) is reached. In an embodiment, the saved test case 120 includes the state of the architectural model and the state of the ISG 104. In certain embodiments, the architectural state that is saved in the saved test case 120 can include processor register values, such as the data registers, address registers, general-purpose registers (GPRs), floating-point registers (FPRs), and system registers; memory state (data value associated with each used memory address); and translation table state (access bit, dirty bit, etc.). In certain embodiments, the generator state that is saved in the saved test case 120 can include the random number generation state and constraint information that reflects the effects of the generation of the previous instructions such as, but not limited to, register usage history and reservation status of register or memory. The saved test template 120 can then be used as the "initial conditions" of the ISG 104 and a new or adjunct test template(s) 122 as input to the ISG 104 for generating a new executable test case 124, which can then be executed in the design simulation environment 108. It should be noted that the two ISG 104 in the FIG. 2 represent two invocations of the ISG 104 program and not two instances (i.e., the same ISG 104 is being used for both the initial test template 102 and the adjunct test template(s) 122).

Figure 3:
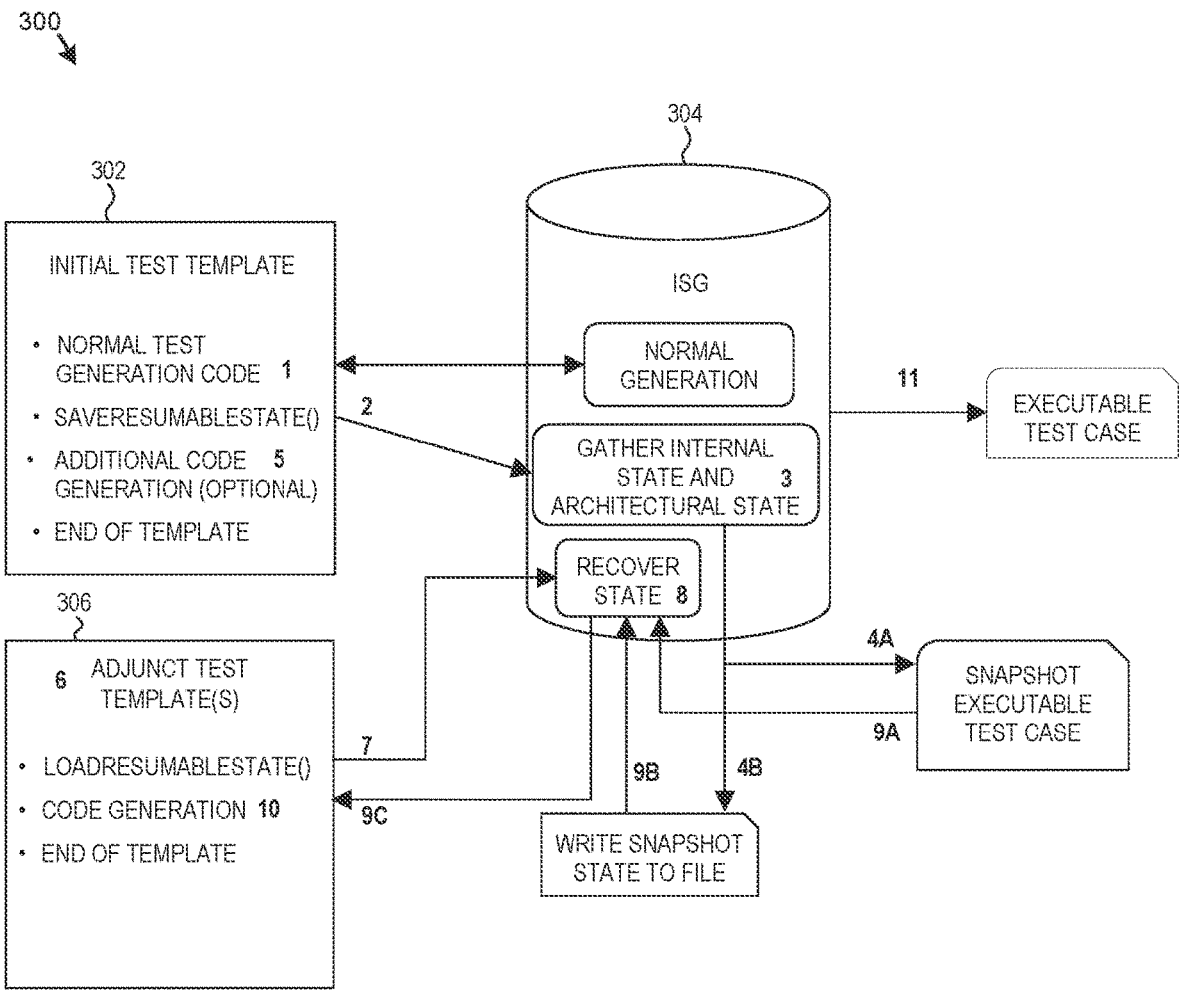
FIG. 3 is a diagram illustrating a process for resumable instruction generation for testing a processor design model in accordance with an embodiment of the present disclosure.

FIG. 3 is a diagram illustrating a process 300 for resumable instruction generation for testing a processor design model in accordance with an embodiment of the present disclosure. In the depicted embodiment, one or more test generation templates are written to define the types of operations that are desired for the test. These test templates guide the instruction sequence generator (ISG) 304 with a series of API calls that control what instructions get generated, what attributes those instructions have, what memory characteristics are required, and what type of machine configuration is targeted. A call or function call causes or initiates code for the function to be executed by the processor. One or more of the test templates serves as an initial test template 302 and will include a resume point marker that is used to establish a point at which the generation state is saved as described above. One or more secondary or adjunct template(s) 306 contain additional generation commands to control generation of more instructions. In an embodiment, the secondary or adjunct template(s) 306 can be placed in a list for sequential execution. In an embodiment, an adjunct template 306 can also include a resume point marker that is used to establish another resume state that can be saved for future testing.

In an embodiment, the process 300, at step 1, starts execution of the initial test template 302 as normal. The ISG 304 executes the normal test generation code based on the initial test template 302. When a resume point marker is reached (e.g., self.saveResumableState( ) in FIG. 4), the initial test template 302, at step 2, calls a saveResumableState( ) API function of the ISG 304. Executing the saveResumableState( ) API function causes the ISG 304, at step 3, to gather the architectural state, the appropriate internal state, and create, at step 4A, a snapshot executable test case that includes the executable test case generated by the ISG 304 based on the initial test template 302 up to the resume point marker. The term snapshot as used herein means a file that captures the state of certain data at a particular time. For instance, the snapshot executable test case is a file that includes a copy of the executable test case generated by the ISG 304 based on the initial test template 302 prior to the ISG 304 encountering the resume point marker in the initial test template 302. In an embodiment, the ISG 304, at step 4B, writes/saves a snapshot state of the ISG 304 (i.e., the architectural state and all necessary, non-architectural state of the ISG 304) to an external file and/or an internal object. The saved snapshot state of the ISG 304 can be used to restore the ISG 304 back to a state when the ISG 304 encounters the resume point marker in the initial test template 302. In an embodiment, when there are additional generation instructions in the initial test template 302 beyond the resume point marker, the additional generation instructions in the initial test template 302 are completed at step 5.

At step 6, the adjunct test template(s) 306 generation is started. In an embodiment, the adjunct test template(s) 306 begins by calling a loadResumableState( ) API function of the ISG 304 to set the internal state of the ISG 304 to a recover state 8 by reading, at steps 9A and 9B, the saved snapshot executable test case and the saved snapshot state of the ISG 304 that contains all the information/values needed to recreate the internal state of the ISG 304 at the resume point.

After loading the ISG 304 internal state at step 9C, code generation for creating the executable test case begins, at step 10, in the adjunct test template(s) 306. Instruction generation in the adjunct test template 306 proceeds as normal. When the adjunct test template(s) 306 completes, the ISG 304, at step 11, saves the executable test case along with the other output files and logs as normal. In an embodiment, the snapshot executable test case is set as a "prefix" for the test case generated by the adjunct test template(s) 306 (i.e., the instructions sequence generated by the ISG 304 using the adjunct test template(s) 306 is appended to the instructions sequence generated by the ISG 304 using the initial test template 302). This process can be repeated for additional secondary/adjunct test template(s) 306 with instructions of each of the adjunct test template(s) 306 appended to the end of the instructions generated by the initial test template 302.

FIG. 4 is a diagram illustrating an example of an initial test template 400 in accordance with an embodiment of the present disclosure. In the depicted embodiment, the initial test template 400 calls a class MyMainSequence to generate an instruction sequence. This test template generates 10 consecutive load instructions to try to achieve a targeted condition/state. An example of a targeted state might be having multiple concurrent outstanding data cache misses.

After the instruction sequence is generated, the initial test template 400 calls self.saveResumableState( ) to save to the snapshot state of the ISG and the snapshot executable test case as previously described. Although the initial test template 400 ends with the self.saveResumableState( ) as stated above, the initial test template 400 could include additional generation instructions beyond the resume point marker (i.e., where save resumable state is called), which would be completed after saving the resumable state. In an embodiment, the location/placement of the resume point marker can be determined by running an initial test template without a resume point marker, and an alert or notification can be generated when a desired internal processor state has been achieved. The alert can be generated programmatically or manually by an engineer via a visual inspection of the processor internal states. On a subsequent running of the initial test template, the location of the resume point marker can then be inserted into the initial test template, as shown in initial test template 400, at the spot that the alert is generated so that the desired internal processor state can be saved for additional testing.

FIG. 5 is a diagram illustrating an example of a test case 500 in accordance with an embodiment of the present disclosure. The test case 500 is the result of executing the initial test template 400 in FIG. 4. The test case 500 includes a sequence of 10 consecutive load instructions that can be executed to test a processor design. Coverage analysis can be performed to verify that this test sequence achieves the desired targeted state within the processor model under test. If the targeted state is achieved, then the test template can be used as the initial test template 400 to be combined with adjunct test templates. The adjunct test templates will generate instructions that target other events that will happen inside the processor simulation model. These events will all be occurring in the context of the state that exists after the execution of the instructions created by the initial test template 400. The test case 500 can be saved as a text file or other format such as, but not limited to, an executable and linkable format (ELF) file.

FIG. 6 is a diagram illustrating an example of an adjunct test template 600 in accordance with an embodiment of the present disclosure. In the depicted embodiment, the adjunct test template 600 calls the loadResumableState( ) API function of the ISG to retrieve the state and test case that was generated from the initial test template 400. The internal generation state of the ISG is initialized with the retrieved information, so that the instruction generation that occurs in the adjunct test template 600 is consistent with the test case from the initial test template 400. In the depicted embodiment, once the internal generation state of the ISG is initialized to the resume point, the adjunct test template 600 then generates an instruction sequence by selecting 10 instructions at random from the set of instructions in the RV32I_instructions dictionary.

FIG. 7 is a diagram illustrating an example of a test case 700 resulting from running the adjunct test template in accordance with an embodiment of the present disclosure. In an embodiment, the test case 700 is the new test case after generating instructions with the adjunct test template 600 in FIG. 6. In the depicted embodiment, the instruction sequence of test case 700 is appended to the instruction sequence of the test case 500 from the initial test template 400.

Figure 8:
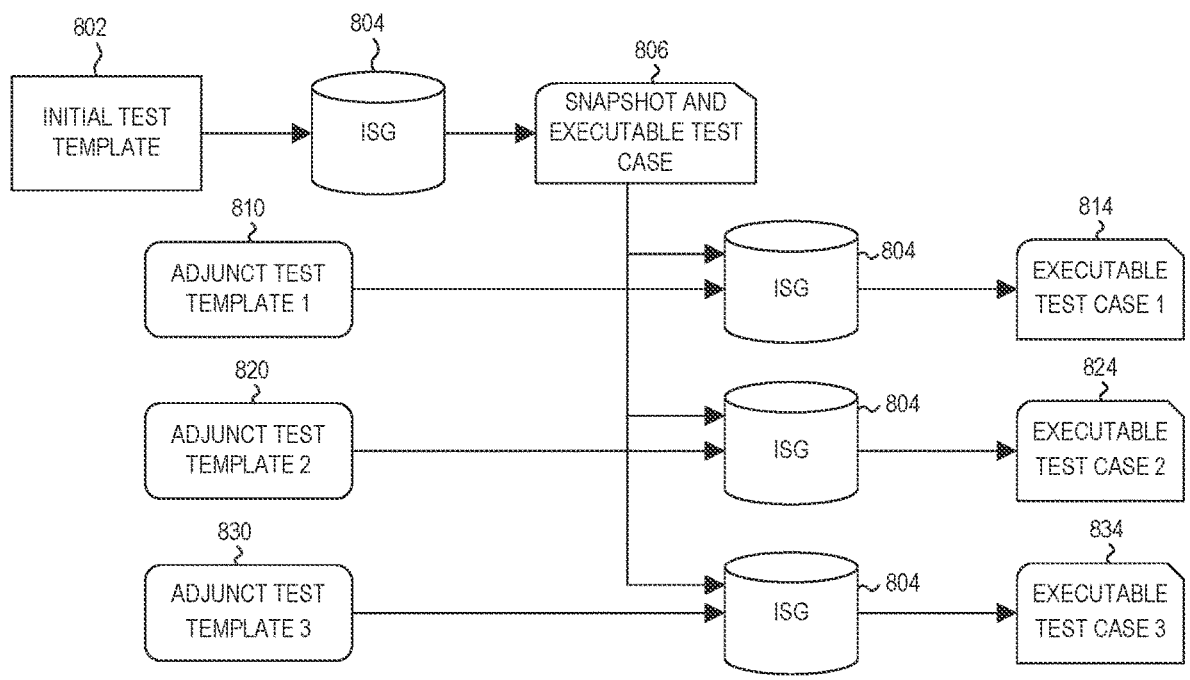
FIG. 8 is a diagram illustrating the execution of multiple adjunct test templates in accordance with an embodiment of the present disclosure.

FIG. 8 is a diagram illustrating the execution of multiple adjunct test templates in accordance with an embodiment of the present disclosure. In the depicted embodiment, an initial test template 802 is executed by an ISG 804. At a designated resume point or marker, a snapshot and executable test case 806 is created and saved as previously described. The snapshot and executable test case 806 can then be used for running one or more adjunct test templates. For example, the snapshot and executable test case 806 information can be used to restore the ISG 804 back to a state when the resume point was triggered. Once the resume state is loaded, the ISG 804 can execute an adjunct test template 1 810 to produce an executable test case 1 814. Similarly, the ISG 804, when restored back to the resume state based on the information from the snapshot and executable test case 806, can execute an adjunct test template 2 820 to produce an executable test case 2 824, and an adjunct test template 3 830 to produce an executable test case 3 834. Each of the executable test cases 814, 824, and 834 include the instructions sequence saved in the snapshot and executable test case 806 produced from the initial test template 802. This procedure can be repeated for any number of additional adjunct test templates. The adjunct test templates 810, 820, and 830 can either be either executed one at a time or in some cases, can be executed in parallel.

Figure 9:
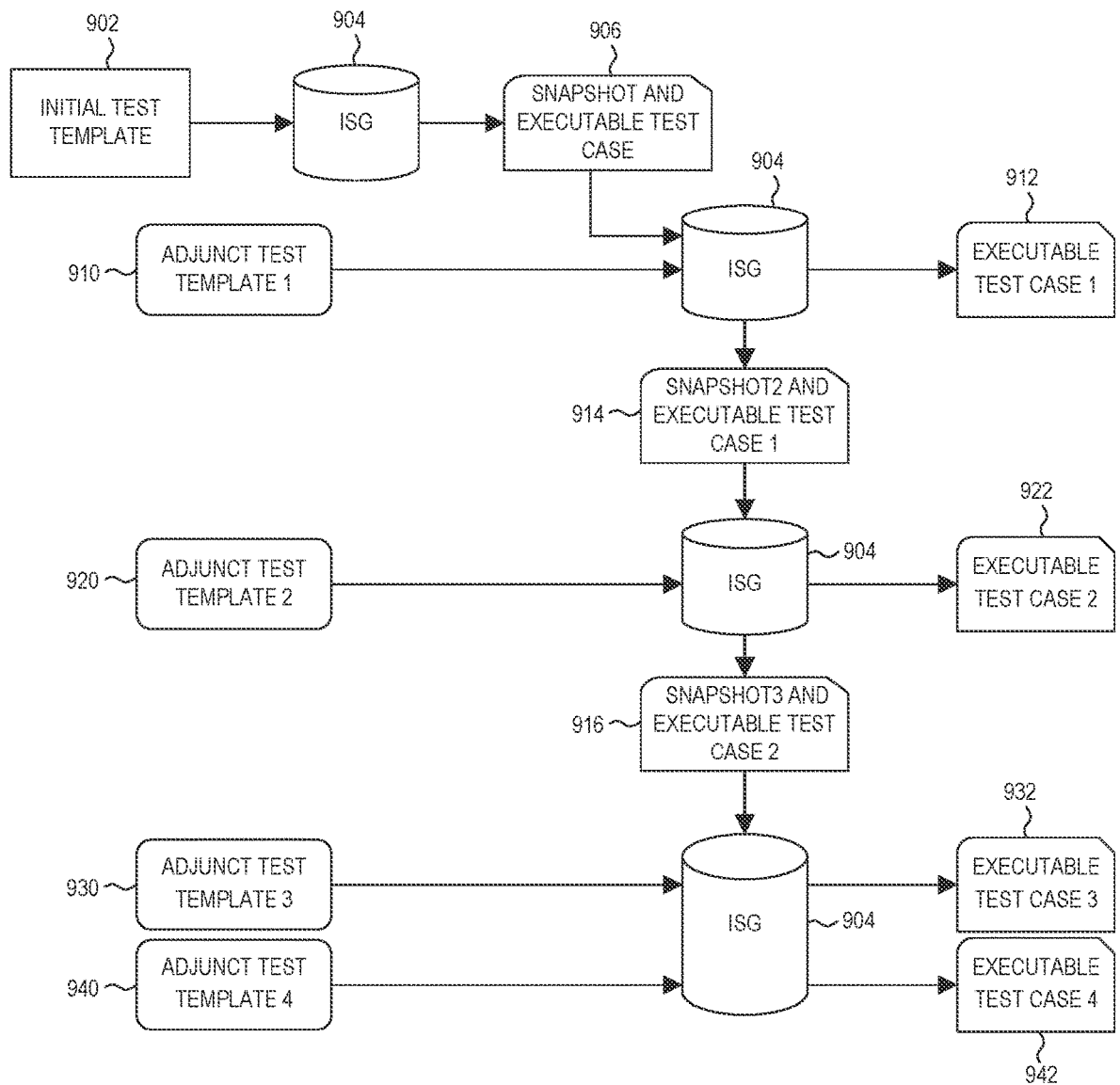
FIG. 9 is a diagram illustrating the execution of multiple adjunct test templates in accordance with another embodiment of the present disclosure.

FIG. 9 is a diagram illustrating the execution of multiple adjunct test templates in accordance with another embodiment of the present disclosure. Similar to FIG. 8, an initial test template 902 is executed by an ISG 904. At a designated resume point or marker, a snapshot and executable test case 906 is created and saved as previously described. The snapshot and executable test case 906 can then be used for running one or more adjunct test templates as described above such as, but not limited to, adjunct test template 1 910 to produce an executable test case 1 912. However, in the depicted embodiment, the adjunct test template 1 910 includes a resume point marker where the saveResumableState( ) API function of the ISG 904 is called to save a second snapshot state of the ISG and the snapshot executable test case at a different state as represented by snapshot2 and executable test case 1 914. The snapshot2 and executable test case 1 914 contains information related to the state of the ISG 904 at the resume point and the instruction sequence from the snapshot and executable test case 906 produced from the initial test template 902 as well as the instruction sequence produced from the adjunct test template 1 910 up to the resume point marker in the adjunct test template 1 910. A second adjunct test template (e.g., adjunct test template 2 920) can then be executed from the resume point of the first adjunct test template 1 910 using the information from the Snapshot2 and Executable test case 1 914 to produce an executable test case 2 922. The adjunct test template 2 920 can also include a resume point marker where saveResumableState( ) API function of the ISG 904 is called to save a third snapshot state of the ISG and the snapshot executable test case (e.g., snapshot3 and executable test case 2 916) that builds on the prior saved stated. Additionally, multiple adjunct test templates can be executed from a single saved snapshot. For example, the saved snapshot3 and executable test case 2 916 can be restored on the ISG 904 and be used to execute an adjunct test template 3 930 to produce an executable test case 3 932. Similarly, the saved snapshot3 and executable test case 2 916 can be restored on the ISG 904 and be used to execute an adjunct test template 4 940 to produce an executable test case 3 942. The executable test case 3 932 and executable test case 3 942 include all the previous instruction sequences stored in the prior saved snapshots and executable test cases 906, 914, and 916.

Figure 10:
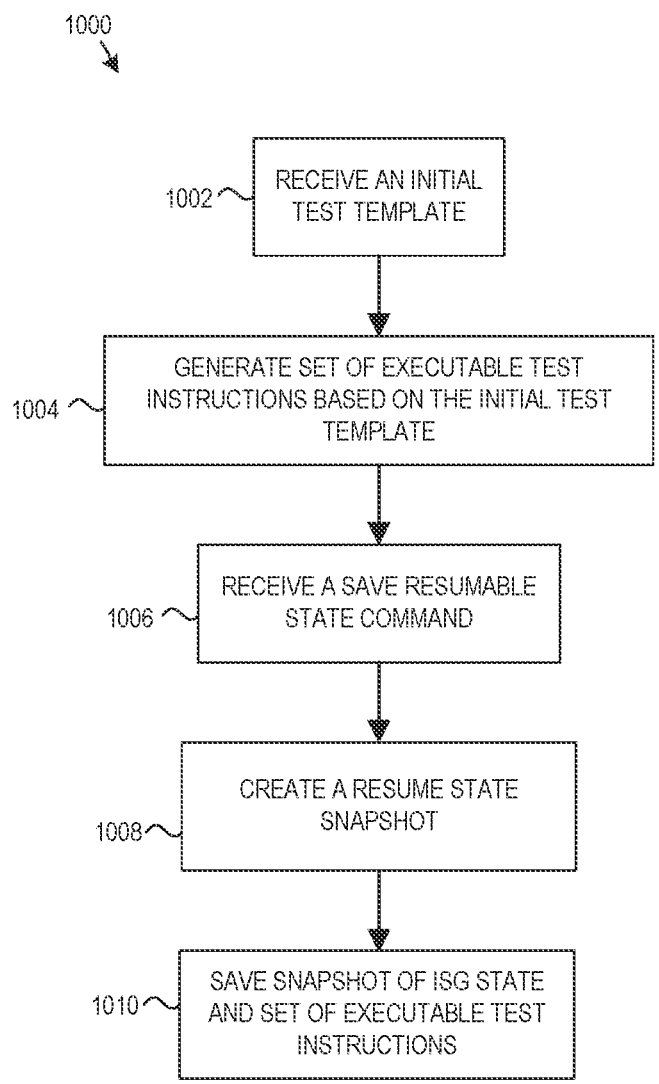
FIG. 10 is a flowchart illustrating a process for creating a resume state of an ISG and test template for testing a processor in accordance with an embodiment of the present disclosure.

FIG. 10 is a flowchart illustrating a process 1000 for creating a resume state of an ISG and test template for testing a processor in accordance with an embodiment of the present disclosure. In an embodiment, the process 1000 is performed by an ISG such as the ISG 104 in FIG. 1 and FIG. 2. At step 1002, the ISG receives an initial test template as input data. The initial test template includes an initial set of instruction constraints. As previously stated, the instruction constraints can define which instructions should be generated, the order of the instructions, and their interrelationships. The instruction constraints can also define the specifics for each instruction such as, but not limited to, which processor registers and memory addresses to use, and what side effects occur.

At step 1004, the ISG generates a first set of executable test instructions containing a sequence of instructions based on the instruction constraints in the initial test template. The executable test instructions can be used to test a processor design. At step 1006, the ISG receives a save resumable state command specified in the initial test template. At step 1008, the ISG creates a resume state snapshot of the ISG that captures the state of the ISG when the save resumable state command is called. The resume state snapshot contains all the data needed to recreate the internal state of the ISG 304 at the resume point such as, but not limited to, the state of registers, memory, random number generator, usage history, register registrations, and memory registrations.

At step 1010, the ISG saves a snapshot of the ISG resume state and the first set of executable test instructions. In an embodiment, the snapshot includes the first set of executable test instructions generated using the initial test template up to when the save resumable state command was called in the initial test template. In an embodiment, when there are instruction constraints in the initial test template after the save resumable state command, the process 1000 can include generating additional executable test instructions based on the instruction constraints in the initial test template after the save resumable state command. These additional executable test instructions become part of the first set of executable test instructions, but not part of the snapshot of the first set of executable test instructions because the snapshot only contains the executable test instructions up to the point the save resumable state command is called.

Figure 11:
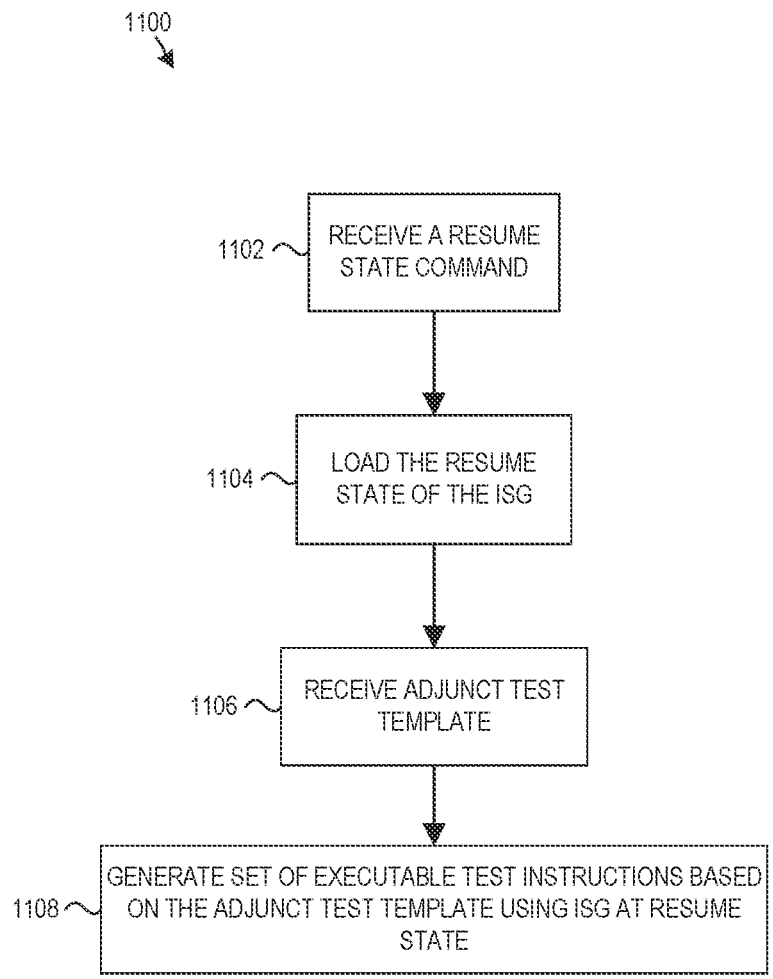
FIG. 11 is a flowchart illustrating a process for executing an adjunct test template using a saved snapshot of an ISG and a snapshot of an executable test case to generate additional instruction sequences for testing a processor in accordance with an embodiment of the present disclosure.

FIG. 11 is a flowchart illustrating a process 1100 for executing an adjunct test template using a saved snapshot of an ISG and a snapshot of an executable test case to generate additional instruction sequences for testing a processor in accordance with an embodiment of the present disclosure. Similar to FIG. 10, the process 1100 can be performed by an ISG such as the ISG 104 in FIG. 1 and FIG. 2. At step 1102, the ISG receives a resume state command specified in the adjunct test template. At step 1104, the ISG loads the resume state of the ISG using information from a saved snapshot of the ISG that was generated from an earlier executed test template. At step 1106, the ISG receives a user-specified adjunct test template as input data. The adjunct test template includes a set of instruction constraints. At step 1108, the process 1100 includes generating, by the ISG, a set of executable test instructions based on the adjunct test template using the ISG restored to the resume state. In an embodiment, the second set of executable test instructions is appended to a snapshot of a set of executable test instructions that was previously generated from the earlier executed test template. As shown in FIG. 8, the process 1100 can be repeated for as many adjunct test templates as desired, and as shown in FIG. 9, an adjunct test template can also create a new resume state snapshot, that can be used by another adjunct test template.

Figure 12:
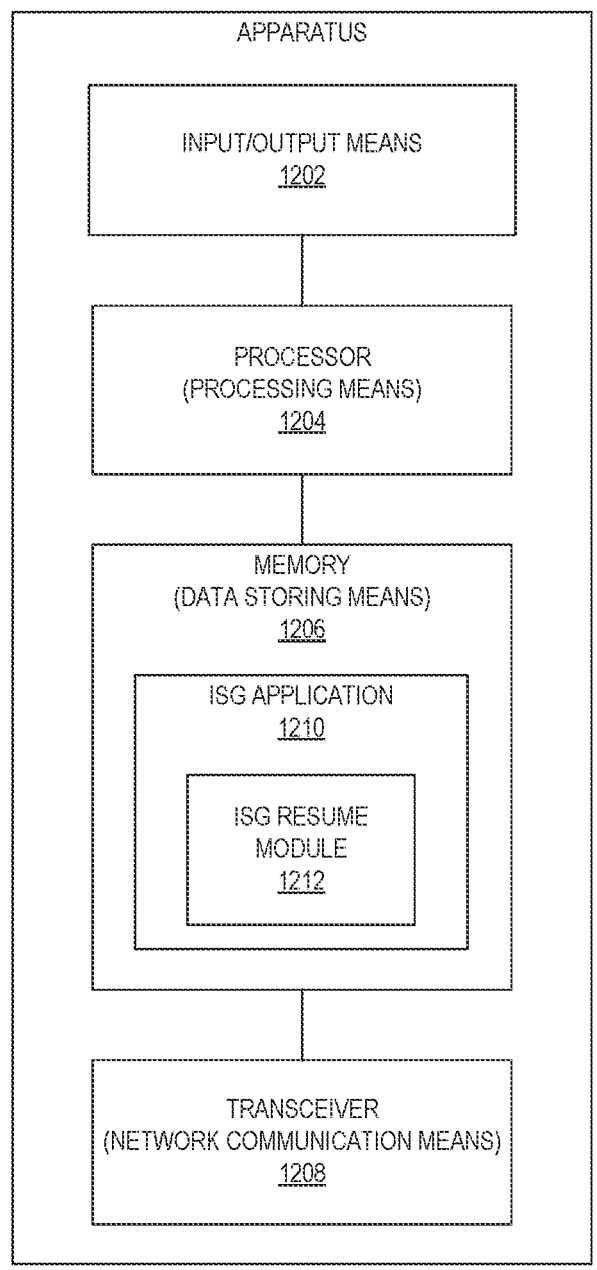
FIG. 12 is a diagram illustrating an apparatus according to an embodiment of the present disclosure.

FIG. 12 is a diagram illustrating an apparatus 1200 according to an embodiment of the present disclosure. The apparatus 1200 can be used to implement any of the embodiments described herein including but not limited to the processes and procedures described in FIGS. 1-11. The apparatus 1200 can be any type of processing system such as, but not limited to, general purpose computers, workstations, servers, mainframes, or a specially configured system designed for an intended purpose. In general, the apparatus 1200 includes an input/output means 1202, one or more processor or processing means 1204, memory or data storing means 1206, and a transceiver or network communication means 1208. The apparatus 1200 can include other components not specifically described herein such as a power unit, a system bus, graphics processing unit (GPU), and various components on a motherboard that enables communications between the input/output means 1202, the one or more processor or processing means 1204, the memory or data storing means 1206, and the transceiver or network communication means 1208.

The input/output means 1202 enables the apparatus 1200 to receive input data from a device such as a mouse, keyboard, touchscreen, or other input device. The input/output means 1202 also enables the apparatus 1200 to output data to an external device such as a monitor.

The one or more processor or processing means 1204 (e.g., a central processing unit (CPU)) are configured to process instructions. The processor or processing means 1204 may be implemented as one or more CPU chips, cores (e.g., as a multi-core processor), field-programmable gate arrays (FPGAs), application specific integrated circuits (ASICs), and digital signal processors (DSPs). The processor or processing means 1204 can be configured to execute instructions stored in the memory or data storing means 1206. Thus, the processor or processing means 1204 provides a means for performing any computational, comparison, determination, initiation, configuration, or any other action corresponding to the claims when the corresponding instruction is executed by the processor.

The memory or data storing means 1206 can be any type of or combination of memory components capable of storing data and/or instructions. For example, the memory or data storing means 1206 can include volatile and/or non-volatile memory such as read-only memory (ROM), random access memory (RAM), ternary content-addressable memory (TCAM), and/or static random-access memory (SRAM). The memory or data storing means 1206 can also include one or more disks, tape drives, and solid-state drives. In some embodiments, the memory or data storing means 1206 can be used as an over-flow data storage device to store programs when such programs are selected for execution, and to store instructions and data that are read during program execution. In some embodiments, the memory or data storing means 1206 can be memory that is integrated with the processor or processing means 1204.

The transceiver or network communication means 1208 enables the apparatus 1200 to send and receive data with to/from one or more devices over one or more networks. The transceiver or network communication means 1208 can provide both wired and wireless communications, and can be configured to operate using one or more communication protocols.

In an embodiment, the memory or data storing means 1206 stores or has an ISG application 1210, such as, but not limited to, the FORCE-RISCV ISG designed to generate tests for design verification of RISC-V processors. In accordance with the disclosed embodiments, the ISG application 1210 can include a new ISG resume module 1212. In an embodiment, the ISG resume module 1212 can include a saveResumableState( ) API function and a loadResumableState( ) API function that can be included in test templates to save a resumable state and load a resumable state as described herein. The disclosed embodiments thus improve the capability of ISGs to generate tests that target hard to reach states within the CPU model under test.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, various elements, steps, or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method performed by an instruction sequence generator (ISG) for generating instruction sequences for testing a processor design model, the method comprising:
   receiving an initial test template comprising an initial set of instruction constraints and a save resumable state command;
   generating a first set of executable test instructions for testing the processor design model based on the initial test template;
   initiating the save resumable state command when the ISG encounters the save resumable state command in the initial test template;
   creating a snapshot comprising information on a resume state of the ISG and the first set of executable test instructions in response to initiating the save resumable state command, wherein the snapshot can be used to place the processor design model to a particular internal processor state; and
   saving the snapshot.

2. The method of claim 1, wherein the particular internal processor state comprises an architectural state and an internal state of the ISG.

3. The method of claim 2, wherein the architectural state comprises register values, memory state, and translation table state.

4. The method of claim 2, wherein the internal state of the ISG comprises a random number generation state and constraint information.

5. The method of claim 1, further comprising:
   receiving a first adjunct test template comprising a second set of instruction constraints and a resume state command;
   initiating the resume state command;
   loading the information from the snapshot in response to initiating the resume state command; and
   generating a second set of executable test instructions based on the first adjunct test template at the resume state of the ISG.

6. The method of claim 5, further comprising:
   receiving a second adjunct test template comprising a third set of instruction constraints;
   generating a third set of executable test instructions based on the second adjunct test template at the resume state of the ISG; and
   appending the third set of executable test instructions to the first set of executable test instructions to generate a second combined set of executable test instructions.

7. The method of claim 5, further comprising appending the second set of executable test instructions to the first set of executable test instructions to generate a combined set of executable test instructions.

8. The method of claim 7, further comprising:
   initiating a second save resumable state command specified in the first adjunct test template;
   creating a second resume state of the ISG in response to initiating the second save resumable state command; and
   saving the combined set of executable test instructions and the second resume state of the ISG.

9. The method of claim 8, further comprising:
   receiving a third adjunct test template comprising a fourth set of instruction constraints and a second resume state command;
   initiating the second resume state command;
   loading the second resume state of the ISG in response to initiating the second resume state command;
   generating a fourth set of executable test instructions based on the third adjunct test template at the second resume state of the ISG; and
   appending the fourth set of executable test instructions to the combined set of executable test instructions to generate a third combined set of executable test instructions.

10. An apparatus for generating instruction sequences for generating instruction sequences for testing a processor design model, the apparatus, comprising:
    a memory storing instructions; and
    a processor in communication with the memory, the processor configured to execute the instructions to cause the apparatus to:
    initiate an instruction sequence generator (ISG);
    receive, by the ISG, an initial test template comprising an initial set of instruction constraints and a save resumable state command;

generate, by the ISG, a first set of executable test instructions for testing the processor design model based on the initial test template;

initiate, by the ISG, the save resumable state command specified in the initial test template when the ISG encounters the save resumable state command in the initial test template;

create, by the ISG, a snapshot comprising information on a resume state of the ISG and the first set of executable test instructions in response to initiating the save resumable state command, wherein the snapshot can be used to place the processor design model to a particular internal processor state; and save, by the ISG, the snapshot.

11. The apparatus of claim 10, wherein the particular internal processor state comprises an architectural state and an internal state of the ISG.

12. The apparatus of claim 11, wherein the architectural state comprises register values, memory state, and translation table state.

13. The apparatus of claim 11, wherein the internal state of the ISG comprises a random number generation state and constraint information.

14. The apparatus of claim 10, wherein the processor is further configured to execute the instructions to cause the apparatus to:

receive, by the ISG, a first adjunct test template comprising a second set of instruction constraints and a resume state command;

initiate, by the ISG, the resume state command;

load, by the ISG, the information from the snapshot in response to initiating the resume state command; and generate, by the ISG, a second set of executable test instructions based on the first adjunct test template at the resume state of the ISG.

15. The apparatus of claim 14, wherein the processor is further configured to execute the instructions to cause the apparatus to:

receive, by the ISG, a second adjunct test template comprising a third set of instruction constraints;

generate, by the ISG, a third set of executable test instructions based on the second adjunct test template at the resume state of the ISG; and append, by the ISG, the third set of executable test instructions to the first set of executable test instructions to generate a second combined set of executable test instructions.

16. The apparatus of claim 14, wherein the processor is further configured to execute the instructions to cause the apparatus to append the second set of executable test instructions to the first set of executable test instructions to generate a combined set of executable test instructions.

17. The apparatus of claim 16, wherein the processor is further configured to execute the instructions to:

initiate, by the ISG, a second save resumable state command specified in the first adjunct test template;

create, by the ISG, a second resume state of the ISG in response to initiating the second save resumable state command; and save, by the ISG, the combined set of executable test instructions and the second resume state of the ISG.

18. The apparatus of claim 17, wherein the processor is further configured to execute the instructions to cause the apparatus to:

receive, by the ISG, a third adjunct test template comprising a fourth set of instruction constraints and a second resume state command;

initiate, by the ISG, the second resume state command;

load, by the ISG, the second resume state of the ISG in response to initiating the second resume state command;

generate, by the ISG, a fourth set of executable test instructions based on the third adjunct test template at the second resume state of the ISG; and append, by the ISG, the fourth set of executable test instructions to the combined set of executable test instructions to generate a third combined set of executable test instructions.

19. A computer program product for generating instruction sequences for testing a processor design model, the computer program product comprising a non-transitory computer readable storage medium having program instructions embodied therewith, the program instructions when executed by a processor are configured to:

initiate an instruction sequence generator (ISG);

receive, by the ISG, an initial test template comprising an initial set of instruction constraints and a save resumable state command;

generate, by the ISG, a first set of executable test instructions for testing the processor design model based on the initial test template;

initiate, by the ISG, the save resumable state command specified in the initial test template when the ISG encounters the save resumable state command in the initial test template;

create, by the ISG a snapshot comprising information on a resume state of the ISG and the first set of executable test instructions in response to initiating the save resumable state command, wherein the snapshot can be used to place the processor design model to a particular internal processor state; and save, by the ISG, the snapshot.

20. The computer program product of claim 19, wherein the program instructions when executed by the processor are further configured to:

receive, by the ISG, a first adjunct test template comprising a second set of instruction constraints and a resume state command;

initiate, by the ISG, the resume state command;

load, by the ISG, the information from the snapshot in response to initiating the resume state command; and generate, by the ISG, a second set of executable test instructions based on the first adjunct test template at the resume state of the ISG.

* * * * *